(12) United States Patent
Nammi et al.

(10) Patent No.: US 10,181,922 B2
(45) Date of Patent: Jan. 15, 2019

(54) SELECTIVE INTERFERENCE CANCELLATION IN THE RANGE-EXPANSION REGION OF A HETEROGENEOUS NETWORK

(71) Applicant: Telefonaktiebolaget L M Ericsson (publ), Stockholm (SE)

(72) Inventors: Sairamesh Nammi, Kista (SE); Andres Reial, Malmö (SE); Yi-Pin Eric Wang, Fremont (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 159 days.

(21) Appl. No.: 14/912,751

(22) PCT Filed: Aug. 19, 2014

(86) PCT No.: PCT/SE2014/050948
§ 371 (c)(1),
(2) Date: Feb. 18, 2016

(87) PCT Pub. No.: WO2015/026284
PCT Pub. Date: Feb. 26, 2015

(65) Prior Publication Data
US 2016/0197693 A1    Jul. 7, 2016

Related U.S. Application Data

(60) Provisional application No. 61/867,321, filed on Aug. 19, 2013.

(51) Int. Cl.
*H04J 11/00*       (2006.01)
(52) U.S. Cl.
CPC .................... *H04J 11/005* (2013.01)

(58) Field of Classification Search
CPC .. H04J 11/005; H04J 11/0053; H04J 11/0056; H04J 11/0023
See application file for complete search history.

(56) References Cited

U.S. PATENT DOCUMENTS 9,775,001 B2 *   9/2017   Dunkin ............... H04L 67/2847
2010/0309861 A1 *  12/2010   Gorokhov ............ H04B 1/7103
                                                         370/329

(Continued)

FOREIGN PATENT DOCUMENTS

WO     2012177203 A1    12/2012

*Primary Examiner* — Chi H Pham
*Assistant Examiner* — Weibin Huang
(74) *Attorney, Agent, or Firm* — Murphy, Bilak & Homiller, PLLC

(57) ABSTRACT

A mobile terminal determines that it is operating in a range-expansion region and performs interference cancellation techniques that are particularly advantageous in the range-expansion region. An example method of receiving a target link signal at a receiving device, where the target link signal is received in a received signal that also includes an interfering link signal, thus includes determining (510) that the receiving device is operating in a range-expansion region of a low-power node in a heterogeneous network deployment, based on a serving-cell geometry metric or a dominant-interferer ratio metric or both. The method further includes configuring (520) the receiving device to perform interference cancellation, responsive to determining that the receiving device is operating in a range-expansion region. The example method continues with performing (530) the configured interference cancellation on the interfering link signal, and then demodulating and decoding (540) the target link signal.

30 Claims, 6 Drawing Sheets

(56) References Cited

U.S. PATENT DOCUMENTS

| | | | |
|---|---|---|---|
| 2011/0194527 A1* | 8/2011 | Lin | H04B 7/022 370/330 |
| 2012/0188884 A1* | 7/2012 | Simonsson | H04W 36/0083 370/252 |
| 2012/0282864 A1 | 11/2012 | Dimou et al. | |
| 2013/0114438 A1* | 5/2013 | Bhattad | H04J 11/005 370/252 |
| 2013/0163529 A1 | 6/2013 | Chen et al. | |
| 2014/0206359 A1* | 7/2014 | Vasudevan | H04W 36/22 455/439 |
| 2014/0242989 A1* | 8/2014 | Cai | H04W 52/54 455/436 |
| 2014/0301360 A1* | 10/2014 | Bontu | H04W 36/0083 370/331 |
| 2015/0163707 A1* | 6/2015 | Hwang | H04W 36/0061 370/331 |
| 2015/0296400 A1* | 10/2015 | Yang | H04W 16/32 370/252 |
| 2015/0358100 A1* | 12/2015 | Jung | H04J 11/005 370/329 |

\* cited by examiner

SELECTIVE INTERFERENCE CANCELLATION IN THE RANGE-EXPANSION REGION OF A HETEROGENEOUS NETWORK

TECHNICAL FIELD

The present disclosure is directed to network communications and, more particularly, to wireless communications using interference cancellation.

BACKGROUND

In a typical wide-area wireless communications network (commonly referred to as cellular radio system), wireless terminals (also referred to as user equipment unit nodes, UEs, and/or mobile stations) communicate, through a radio access network (RAN), with one or more core networks, which provide connectivity to the public switched telephone network (PSTN) and/or to one or more data networks, such as the Internet. The RAN covers a geographical area that is divided into cell areas, with each cell area being served by a radio base station, also referred to, in various contexts, as a RAN node, a "NodeB", or an enhanced NodeB ("eNodeB" or "eNB"). A cell area is a geographical area over which radio coverage is provided by the base station equipment at a (typically) fixed base station site. The base stations communicate, through radio communication channels, with UEs within range of the base stations.

In such a communications network, the maximum data rate that can be supported over a particular link between a base station and a wireless terminal may be limited by interference from other sources. As shown in FIG. 1A, for example, base station 19a may receive uplink communications from wireless terminals 11a and 15a. At a receiver of base station 19a, uplink communications from another wireless terminal 15a may interfere with reception of the uplink communications from wireless terminal 11a. A link of interest may be referred to as a "target link," or "TL," while a radio link that interferes with a link of interest may be referred to as an "interfering link," or "IL." A receiver that is attempting to receive (i.e., demodulate and decode) a TL is referred to as a TL receiver. Thus, in FIG. 1A, the uplink from wireless terminal 11a is referred to as "TL," for "target link," while the uplink communications from wireless terminal 15a is referred to as "IL," for "interfering link." It will be appreciated, of course, that the uplink from wireless terminal 11a may also interfere with those from wireless terminal 15a, so the designations "TL" and "IL" refer only to a particular demodulation scenario of interest, and may be applied to the same uplink in different scenarios.

A different interference scenario is illustrated in FIG. 1B. As shown in FIG. 1B, base station 19b-1 may transmit downlink communications to wireless terminal 11b, while base station 19b-2 is transmitting downlink communications to wireless terminal 15b. At a receiver of wireless terminal 11b (where the desired link is referred to as TL), downlink communications from base station 19b-2 to wireless terminal 15b (referred to as an IL) may interfere with reception of the downlink communications from base station 119b-1 to wireless terminal 11b. The dashed line in FIG. 1B indicates the IL as perceived/received at wireless terminal 11b.

Still another interference scenario is illustrated in FIG. 1C. As shown in FIG. 1C, base station 19c may transmit downlink communications to wireless terminals 11c and 15c. At a receiver of wireless terminal 11c (where the desired link is referred to as TL), downlink communications from base station 19c to wireless terminal 15c (referred to as IL) may interfere with reception of the downlink communications from base station 119c to wireless terminal 11c. The dashed line in FIG. 1C indicates the IL as perceived/received at wireless terminal 11c.

In any of the examples of FIGS. 1A, 1B, and/or 1C, a received signal at a TL receiver (at a wireless terminal or at a base station) may include a TL with information intended for the TL receiver and one or more interfering links. A ratio of received signal power of the TL to a received signal power of one or more ILs (as received at the receiver attempting to receive the TL) plus other noise and interference, may be referred to as a geometry factor. The geometry factor can be a significant factor determining an achievable data rate for the target link. Stated in other words, a greater geometry factor (i.e., a greater ratio of TL signal strength to IL signal strength at the TL receiver) may allow a greater data rate to be transmitted over the TL to the TL receiver than a lower geometry factor (i.e., a lower ratio of TL signal strength to IL signal strength at the TL receiver). By reducing an effective power of an IL at a receiver (which may result from traffic data transmissions, for example), an effective geometry factor for the TL at the TL receiver may be increased/improved, thereby improving receiver performance and/or allowing increased data rates. An effective power of an IL may be reduced using linear suppression or interference cancellation (IC) techniques, for example. Interference cancellation techniques include pre-decoder interference cancellation (pre-decoder IC), or post-decoder interference cancellation (post-decoder IC).

With linear suppression, the TL receiver includes multiple receiver (RX) antennas, and an antenna lobe is steered, by applying carefully determined delays to the multiple antenna paths, so as to point a spatial null in the direction from which a dominant source of interference is arriving. Statistics of the received signal may be used to determine the delays/combining weights leading to the desired spatial pattern, e.g., using Interference Rejection Combining (IRC) to provide improved Signal-to-Interference-and-Noise Ratio (SINR).

To significantly suppress the IL with a two-antenna receiver, the IL should arrive from a well-defined single direction. Null steering may not be effective in dispersive environments where several reflections from different directions may contribute, however. Moreover, if the null-steering degree of freedom is used to suppress the IL, this degree of freedom may no longer be available for spatial inter-symbol interference (ISI) suppression or inter-stream interference suppression in multiple-input, multiple-output (MIMO) transmissions on the TL, thus significantly lowering the equalization efficiency.

With pre-decoder interference cancellation, the receiver demodulates the IL from a received signal and applies hard decisions to the symbol estimates resulting from the demodulation, to reconstruct the transmitted symbol sequence. The reconstructed symbol sequence for the IL is filtered with the channel response to create an estimate of the received interfering signal, which is subtracted from the received signal to create an interference-reduced residual signal. After that, the desired TL signal is demodulated and decoded from the interference-reduced residual signal. With interference cancellation, the TL signal may be demodulated and decoded with higher quality than without interference cancellation.

Pre-decoder interference cancellation may be effective when the raw symbol signal-to-interference-plus-noise ratio (SINR) of the IL at the target receiver is sufficiently high to make reliable hard decisions. If the raw symbols of the IL are not sufficiently reliable, however, applying hard decisions may lead to significant decision errors and to interference amplification instead of cancellation.

With post-decoder interference cancellation, the receiver demodulates and decodes the IL from a received signal. The resulting decoded bit sequence for the IL may then be re-encoded and the coded bits passed through a modulator to reconstruct the transmitted symbol sequence for the IL. The reconstructed sequence may then be filtered with the channel response and subtracted from the received signal. After that, the desired TL signal is demodulated and decoded from the interference-reduced residual signal. Once again, with interference cancellation the TL signal may be demodulated and decoded with higher quality than without interference cancellation.

Post-decoder interference cancellation may be effective when the Modulation and Coding Scheme (MCS) applied to the IL is sufficiently conservative (with e.g., sufficiently low code rate) for the TL receiver to be able to reliably demodulate and decode the interfering signal. If radio conditions of the IL between the IL transmitter and the intended IL receiver are better than radio conditions of the IL between the IL transmitter and the TL receiver, the TL receiver may not be able to successfully decode the IL transport block. This situation may be detected using error detection/correction (such as a Cyclic Redundancy Check or CRC), which means that any degradation due to incorrect IC feedback may be avoided, but no TL geometry improvement will be achieved in this case.

Inter-cell interference is often one of the dominant impairments that limit receiver performance and the achievable data rates in cellular networks. Interference cancellation (IC) of inter-cell interference is thus an important aspect of improving data rates in throughput in cellular networks, particularly in heterogeneous networks, where cells with different coverage patterns and different downlink output powers are deployed in an overlapping manner over a network coverage area.

To apply IC to signals originating from other cells, knowledge of certain signal format parameters for the interfering signals is required to configure the receiver. For pre-decoding IC, information about resource allocation, modulation format, any pre-coding applied, the number of MIMO layers, etc., may be necessary. This information may be obtained by any of several means, including via blind estimation, eavesdropping on other-cell control signaling, or via network assistance features. For post-decoding IC, transport format parameters for the interfering signal or signals are additionally required. These transport format parameters may typically only be obtained from receiving or eavesdropping on the related control signaling info.

As already noted, heterogeneous networks (HN) differ from traditional networks in that cells with different coverage patterns and downlink output powers are deployed simultaneously over the entire network coverage area. In some cases, small cells or low-power nodes (LPNs) are placed so that they overlap with some parts of the existing macro cell coverage area, thus facilitating the offloading of some of the macro-cell UE population and increasing the overall network capacity. Some deployment schemes exist where the geographically dispersed macro and LPN cells are centrally controlled by a single base station, in a main-remote configuration, where the LPNs are the remote radio units (RRUs). Currently, a combined-cell/shared-cell scheme utilizing this concept is being standardized by the $3^{rd}$-Generation Partnership Project (3GPP).

The downlink output powers of an LPN in the HN setup (e.g., +30 dBm) may typically be 10 dB or more below that of a typical macro cell power (e.g., +43 dBm). The downlink power differences lead to an uplink/downlink coverage imbalance for the LPNs. To more fully utilize the uplink capacity increase offered by the LPNs, the network may instruct an LPN to serve UEs for which the received downlink power for the LPN is weaker than that of the macro node. The margin is controlled via a Cell Individual Offset (CIO) parameter, and may typically be around 6-10 dB. Thus, the LPN may be required to serve UEs that receive the LPN's downlink signal at a strength that is as much as 10 dB below than a received signal from the neighboring macro cell. The area where the received downlink power from the serving LPN is lower than that from a neighboring macro cell is referred to as the range-expansion (RE) region, and is illustrated in FIG. 1D as the striped region encircling the LPN near the right-hand side of the figure.

While the CIO applied to the downlink signal power measurements increases the offloading potential, it simultaneously makes it more difficult for UEs in the RE region to receive their downlink signaling and data from the serving LPN. For this reason, IC has been proposed in 3GPP as an enabling technology for RE region operation. By removing a significant fraction of the interfering macro cell power, the own-cell effective geometry for the LPN downlink is improved, and the downlink signaling and data may be received with increased reliability and throughput.

SUMMARY

In state-of-the-art UE IC receivers, a certain set of IC features is implemented, e.g. pre- or post-decoding traffic data IC, pilot IC, control channel IC, etc., with a fixed set of support functions for obtaining interferer MCS and other signal structure information. For a given receiver, a particular feature or set of features is applied in all environments and scenarios. However, any one of the interference suppression or cancellation techniques discussed above may be unable to provide a high level of interference cancellation over a full range of varying radio conditions.

According to several of the techniques, apparatus, and systems disclosed herein, a UE served by a low-power node (LPN) in a heterogeneous network (HN) and finding itself in the range-expansion (RE) region can use interference cancellation (IC) to remove a significant fraction of the interfering macro cell power. However, the UE IC features required for efficient operation in the RE region differ from operation in other scenarios. Disclosed herein are techniques and apparatus that may be used to solve the problem of detecting that a UE is operating in the RE region and selectively enabling the relevant IC features in the UE in response to such detecting.

Embodiments of the techniques detailed herein include methods of receiving a target link signal at a receiving device, wherein the target link signal is received in a received signal that also includes an interfering link signal. An example method includes determining that the receiving device is operating in a range-expansion region of a low-power node in a heterogeneous network deployment, based on a serving-cell geometry metric or a dominant-interferer ratio metric or both. The method further includes configuring the receiving device to perform interference cancellation, responsive to determining that the receiving device is operating in a range-expansion region. The example method continues with performing the configured interference cancellation on the interfering link signal, and then demodulating and decoding the target link signal to provide a target link bit stream.

The particulars of the configuring the receiving device to perform interference cancellation are based on the determination that the receiving device is in a range-expansion region. Thus, for example, this configuring may include selecting one or more of a plurality of interference-cancellation techniques, where the selection is based on determining that the receiving device is operating in the range-expansion region. In some embodiments, for example, a post-decoding data-channel interference-cancellation technique is selected in response to determining that the receiving device is operating in the range-expansion region, while a pre-decoding technique might otherwise be used for decoding data-channel interference. In some embodiments, a non-data-channel interference-cancellation technique may also be selected in response to determining that the receiving device is operating in the range-expansion region, such that performing said interference cancellation on the interfering link signal comprises performing both the post-decoding data-channel interference-cancellation technique and the non-data-channel interference-cancellation technique on the interfering link signal.

In some of the disclosed embodiments, performing interference cancellation on the interfering link signal comprises generating an interference-cancellation signal according to an interference-cancellation technique and incorporating information of the interference-cancellation signal in the received signal. The subsequent demodulating and decoding of the target link signal is responsive to said incorporating information of the interference-cancellation signal in the received signal.

In some embodiments, configuring the receiving device to perform interference cancellation includes configuring the receiver to receive relevant signals from the network, the relevant signals comprising one or more of signal format information for the interfering link signal, mobile terminal identifier information for the interfering link signal, and control signal contents for the interfering link signal. Performing the interference cancellation then includes obtaining the relevant signals and using the relevant signals to perform interference cancellation, on a per-transmit-time-interval basis. In some embodiments, at least a portion of the relevant signals are obtained via assistance information transmitted from an interfering cell. In addition or alternatively, at least a portion of the relevant signals may be obtained via assistance information transmitted from a serving cell. Likewise, at least a portion of the relevant signals may be obtained via blind decoding performed on an interfering channel signal.

In some embodiments, determining that the receiving device is operating in the range-expansion region is based at least in part on evaluating a signal geometry for the target link signal and determining that the signal geometry for the target link signal is less than about −2 dB. In some of these and in some other embodiments, determining that the receiving device is operating in the range-expansion region is based at least in part on determining that the proportion of received interference power generated by a single interfering source exceeds a first predetermined threshold. For instance, determining that the proportion of received interference power generated by a single interfering source exceeds a predetermined threshold may comprise determining that $$\frac{RSCP_1}{\sum_{i \neq 1} RSCP_i} > \tau_i,$$

where $RSCP_i$ is the received signal code power for cell i, i=1 for the single interfering source, i=0 for the target link signal, and $\tau_1$ is the first predetermined threshold.

In some embodiments, determining that the receiving device is operating in the range-expansion region is based at least in part on computing a ratio of the received signal code power (RSCP) for the interfering link signal to a scaled measure of the total received signal power and comparing the ratio to a second predetermined threshold. For example, determining that the receiving device is operating in the range-expansion region may include determining that $$\frac{RSCP_1}{\left(\frac{E_{c,CPICH}}{I_{or}}\right) RSSI} > \tau_2,$$

where $RSCP_1$ is the received signal code power for the interfering link signal, RSSI is the total received power, $$\left(\frac{E_{c,CPICH}}{I_{or}}\right)$$

is the fraction of transmitted base station power allocated to the common pilot channel, and $\tau_2$ is the predetermined threshold.

Other embodiments of the techniques and apparatus disclosed herein include receiver devices adapted to carry out one or more of the techniques summarized above and detailed herein. An example receiver device thus includes a receiver circuit configured to receive a target link signal wherein the target link signal is received in a received signal also including an interfering link signal, and further comprises a controller circuit configured to carry out one of these techniques. For example, the controller circuit, in some embodiments, is configured to control the receiver circuit to perform own-cell and other-cell measurements and to determine that the receiver device is operating in a range-expansion region of a low-power node in a heterogeneous network deployment, based on a serving-cell geometry metric or a dominant-interferer ratio metric or both. In response to determining that the receiver device is operating in a range-expansion region, the controller circuit configures the receiver circuit to perform interference cancellation, where said configuring is based on said determining. Finally, the controller circuit controls the receiver circuit to perform said interference cancellation on the interfering link signal and to demodulate and decode the target link signal to provide a target link bit stream.

The techniques and apparatus summarized above and described in detail in the following sections can be used to maximize the interference cancellation efficiency for a UE in the RE region, while minimizing the complexity and network signaling load in situations where such efficient IC is not possible. Further features and advantages of the presently disclosed techniques and apparatus will be recognized upon review of the accompanying drawings and the detailed description that follows.

BRIEF DESCRIPTION OF THE DRAWINGS

The accompanying drawings, which are included to provide a further understanding of the techniques detailed herein and are incorporated in and constitute a part of this disclosure, illustrate certain non-limiting embodiment(s) of the disclosed techniques, apparatus, and systems. In the drawings.

DETAILED DESCRIPTION

Figure 1A:
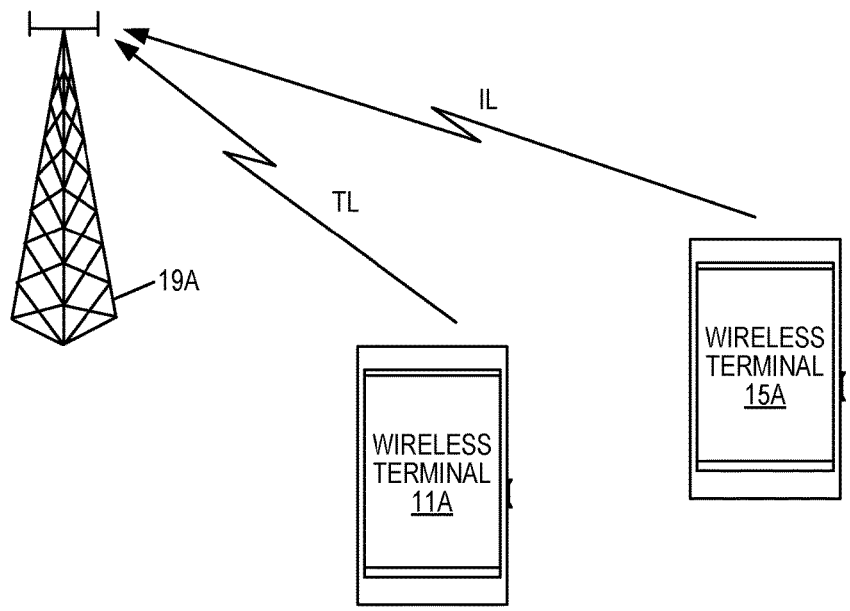
FIGS. 1A, 1B, and 1C are schematic diagrams illustrating interference sources of communication systems.

Inventive techniques, apparatus, and/or systems will now be described more fully hereinafter with reference to the accompanying drawings, in which example embodiments are shown. The techniques, apparatus, and systems detailed herein may, however, be embodied in many different forms and should not be construed as limited to the embodiments set forth herein. It should also be noted that these embodiments are not mutually exclusive. Components from one embodiment may be tacitly assumed to be available for use in or otherwise applicable to another embodiment unless such combination is clearly unworkable.

For purposes of illustration and explanation only, these and other embodiments of the presently disclosed techniques, apparatus, and systems are described herein in the context of operating in a radio access network (RAN) that communicates over radio communication channels with wireless terminals (also referred to as mobile terminals, user equipment, or UEs). It will be understood, however, that the presently disclosed techniques are not limited to such embodiments and may be embodied generally in any type of communication network. As the terms are used herein, a wireless terminal, mobile terminal, or UE can include any device that receives data from a communication network, and may include, but is not limited to, a mobile telephone ("cellular" telephone) or so-called smartphone, as well as any of various types of computing devices equipped with wireless communications capabilities, such as a laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code-division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP's specifications for UTRAN is used in this disclosure to exemplify embodiments of the disclosed techniques, this should not be seen as limiting the scope of these techniques to only these systems. Other wireless systems, including LTE (Long-Term Evolution), WiMax (Worldwide Interoperability for Microwave Access), UMB (Ultra Mobile Broadband), GSM (Global System for Mobile Communications), etc., may also benefit from exploiting embodiments of the present invention disclosed herein.

Such communications systems may support voice radiotelephone communications and/or packet data communications (e.g., according to the HSPA and/or LTE standards). With data communications, a TL may represent transmissions from a TL source to a TL receiver, and an IL may represent transmissions from an IL source to an IL receiver wherein the target link and interfering link sources are different and/or the target and interfering link receivers are different. More particularly, the target and interfering link sources may be part of the same communications system, and/or the target and interfering link receivers may be part of the same communications system. For example, an IL may represent transmissions from an IL source to the TL receiver as discussed above with respect to FIG. 1A, transmissions from an IL source to an IL receiver as discussed above with respect to FIG. 1B, and/or transmissions from the TL source to an IL receiver as discussed above with respect to FIG. 1C.

Figure 1B:
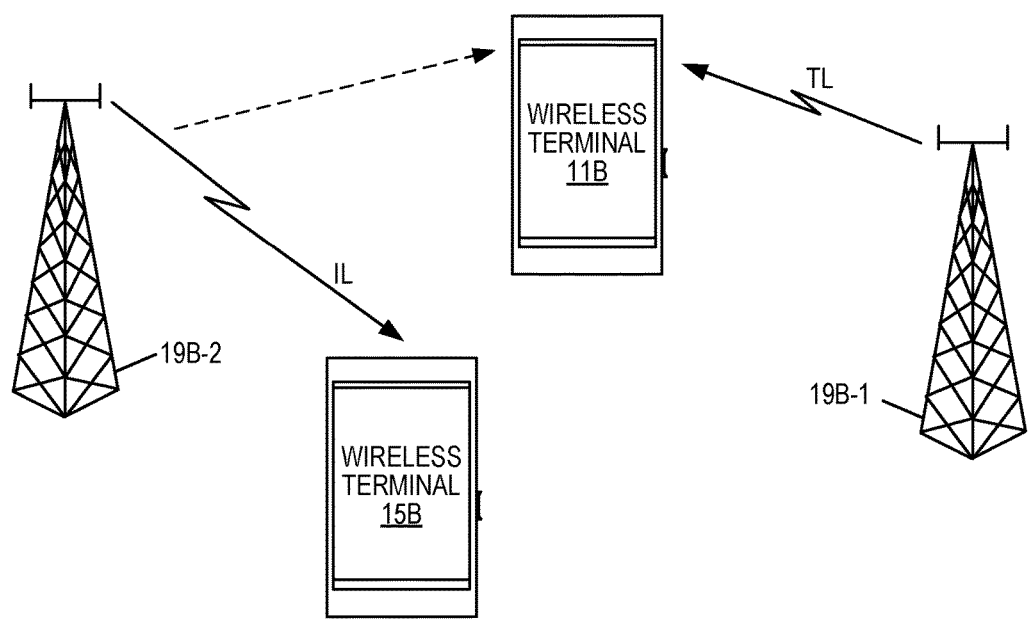
Figure 1C:
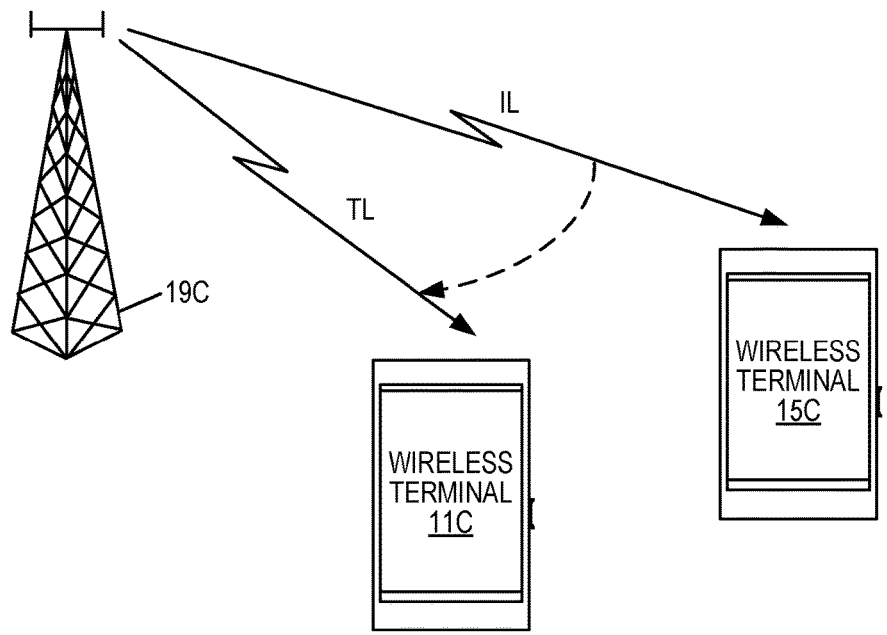
Figure 1D:
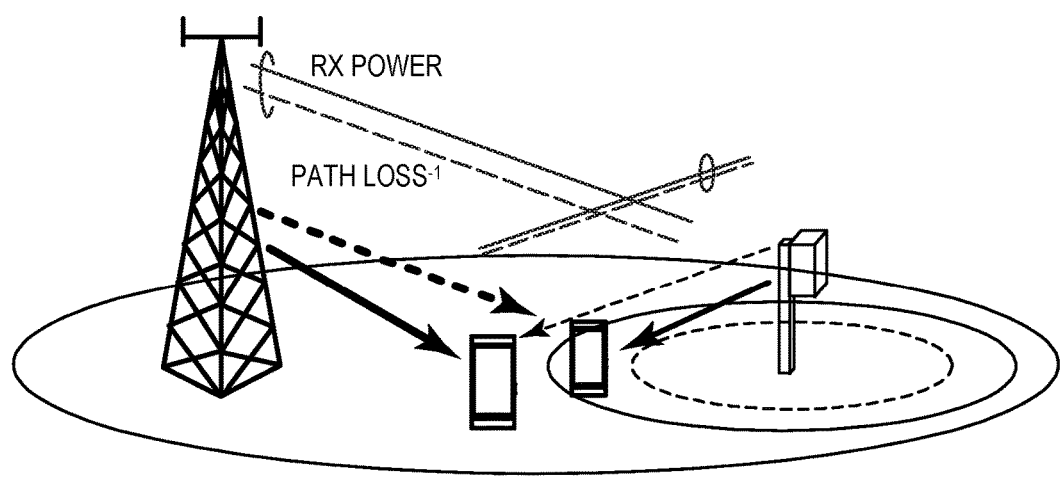
FIG. 1D illustrates the range-expansion (RE) region in an example heterogeneous network deployment.

As noted above, inter-cell interference is often one of the dominant impairments that limit receiver performance and the achievable data rates in cellular networks. Interference cancellation (IC) of inter-cell interference is thus an important aspect of improving data rates in throughput in cellular networks, particularly in heterogeneous networks, where cells with different coverage patterns and different downlink output powers are deployed in an overlapping manner over a network coverage area, e.g., as shown in FIG. 1D.

In state-of-the-art UE IC receivers, a certain set of IC features is typically implemented, e.g., pre- or post-decoding traffic data IC, pilot IC, control channel IC, etc., with a fixed set of support functions for obtaining interferer MCS and other signal structure information. In a given receiver, a particular feature or set of features may be applied in all environments and scenarios. However, any one of the interference suppression or cancellation techniques discussed above may be unable to provide a high level of interference cancellation over a full range of varying radio conditions.

Thus, the traditional approach—fixed IC receiver feature application—is often suboptimal from the resource usage and/or performance viewpoints. Certain features, especially computation-intensive post-decoding IC operation, provide little or no additional gains in some scenarios, and some of the related support information may not be available in all modes. In the range expansion (RE) region in particular, some of the possible IC features are particularly advantageous, and some additional configuration or assistance information may facilitate the application of such features. Therefore, there is a need for an approach in the UE that identifies operation in the RE region and, in that case, invokes the relevant IC features and obtains the required support information.

According to several embodiments of the presently disclosed techniques, then, a UE determines whether it is located in the RE region, e.g., based on the relative signal strengths of the serving cell and the interfering cell(s). If the UE is located in the RE region, it obtains relevant IC support information by configuring the receiver to receive relevant signals from the network. Such signals may include signal format information, UE ID information, and control signal contents, and may be carried by legacy control channels, broadcast assistance channels, UE-specific assistance channels, or in-band signaling. In some cases, the UE may request UE-specific assistance signaling from the network.

In some embodiments, the UE receives relevant support information from the network for each transmit-time interval (TTI), and performs IC features that are particularly advantageous in the RE region, such as post-decoding IC and non-data channel IC (i.e., cancellation of interfering signals corresponding to downlink channels other than the data channel) on the interfering macro cell signal. The UE then uses the interference-cancelled received signal to demodulate and decode the control and data signals of interest from the LPN.

Several of the techniques disclosed herein, then, are based on the idea that the UE can autonomously determine whether it is located in the RE region, activate mechanisms for obtaining relevant support information, and perform appropriate IC features. This approach can be used to improve performance, since certain IC features are most effective in the RE region. More particularly, a low serving-cell geometry in the RE region implies a relatively high interfering-cell geometry for the LPN-served UE. Post-decoder IC thus may provide significant performance gains over the pre-decoder IC mode. In contrast, a UE in normal (non-RE) network conditions typically experiences negligible additional average performance gains from post-decoder IC processing.

In the range expansion region, performance gains from non-data-channel IC can be particularly significant. Since the macro cell signal is the dominant interferer, cancelling a large fraction of that signal provides a dramatic increase in serving-cell signal-to-interference-plus-noise ratio (SINR). Coarsely speaking, removing a fraction x of the macro cell power improves the serving-cell SINR by a factor of $1/(1-x)$. For example, a 10 dB SINR increase may be obtained if 90% of the macro signal is removed. This motivates extra efforts at the UE for cancelling, for example, control and broadcast channels. In contrast, the residual traffic data power after IC in normal (non-RE) network conditions is often so high that additionally removing non-data channels provides only marginal SINR improvements.

Selecting an interference cancellation operating mode in response to detecting that the receiver is operating in the range expansion region can provide additional advantages. For instance, the IC features can be selected based on their ability to utilize support information from the network that is most conveniently available in the RE region. For example, the macro cell's legacy High-Speed Shared Control Channel (HS-SCCH) transmission is often audible to the LPN-served UE in the range expansion region, even if the HS-SCCH is power-controlled to a macro-served UE. Further, additional signaling from macro targeted to the LPN-served UE may require only a low power allocation to be successfully received at the UE in the RE expansion.

Conversely, certain other IC features have little or no impact in the RE region, and should be deactivated. For example, initial soft own-cell data cancellation prior to processing interfering-cell signals is not likely to be effective, because of the low serving-cell signal geometry, and should therefore be deactivated to reduce the processing complexity.

Detecting the RE Region

A UE served by a LPN and located in its RE region experiences a particular interference environment that is atypical for traditional cellular communications. Since large CIO values may be assigned to LPNs by the network, the serving LPN may have an effective geometry factor of −6 dB . . . −10 dB, while the geometries for a traditional serving cell rarely drop below 0 to −2 dB.

In an HSPA network, for example, the UE can assess its geometry via standard UE measurement results. For example, by comparing the total received signal strength, as indicated by the Received Signal Strength Indicator (RSSI) and the Received Signal Code Power (RSCP) of the serving cell, the UE can estimate the serving cell's geometry factor. Denote the cell index $i=0$ as the serving cell and one or more $i=1$ K as interfering cells. Also denote the fraction of the transmitted base station power allocated to the common pilot channel (CPICH) by $$\frac{E_{c,CPICH}}{I_{or}},$$

e.g., −10 dB. The RSSI and RSCP values are then related as:

$$RSSI = 1 / \left(\frac{E_{c,CPICH}}{I_{or}}\right) \sum_{i=0}^{K} RSCP_i + I_o.$$

Then the serving cell geometry may be estimated as:

$$G_0 = \frac{RSCP_0}{\left(\frac{E_{c,CPICH}}{I_{or}}\right) RSSI - RSCP_0}.$$

Alternatively, although based on equivalent signal processing operations, the own-cell and interference plus noise powers may be inferred from power delay profile (PDP) measurements used for cell search and path search. In yet another approach, assuming interference-limited operation, the geometry factor may be approximated from the serving cell and neighbor-cell RSCP measurements:

$$G_0 = \frac{RSCP_0}{\sum_{i=1}^{K} RSCP_i}.$$

Another distinctive feature of the RE region is that almost all the interference is typically generated by a single source—the high-power macro cell—and that the contribution from any additional or non-specific sources is negligible. This aspect may be verified by comparing the RSCP measurement value for the interfering signal to RSCP measurement values from own and neighbor cells, as well as by relating the dominant RSCP value to the RSSI and establishing that only a negligible fraction of RSSI is unaccounted for. Operation in the RE region is thus indicated by:

$$\frac{RSCP_1}{\sum_{i \neq 1} RSCP_i} > \tau_1 \text{ and} \qquad (1)$$

$$\frac{RSCP_1}{\left(\frac{E_{c,CPICH}}{I_{or}}\right) RSSI} > \tau_2, \qquad (2)$$

where $\tau_1$ and $\tau_2$ are implementation-specific thresholds.

By combining the geometry and dominant interferer ratio metrics, the UE can determine whether it is currently located in the RE region. Note that either or both of the tests given in expressions (1) and (2) may be used, but preferably in combination with a geometry factor test, e.g., by evaluating whether the estimated serving-cell geometry is less than about −2 dB.

If all significant neighbor cells are known, the first test, given by expression (1), is preferred. RSCP is the pilot power from a given base station; since the pilot power fraction is known and constant, it is a reliable indicator of the average received energy, including traffic data energy. Expression (1) basically compares the received power from the dominant interferer (RSCP$_1$) to the total power from all other neighbor cells. If the ratio is high (say >20 or so), then there is a clear dominant interferer.

If all neighbor cells are not explicitly known, then the test shown in expression (2) may be invoked. This test is based on the total receiver power estimate RSSI, assuming full network loading. This assumption should generally be appropriate in the event that there is off-loading of the macro cell to the LPN. A properly scaled RRSI value is then compared to the strongest interferer power, which of course we can identify explicitly, and the strongest interferer must make up almost all the RSSI. Thus, the parameter $\tau_2$ ratio may be about 0.95 or so, in some embodiments.

Variants of these two tests are also possible, leading to similar conclusions. Any of the following example variants may be used alone or in combination with an evaluation of the serving-cell geometry, as discussed above:

$$\frac{RSCP_1}{\sum RSCP_i} > \tau_2; \qquad (3)$$

$$\frac{RSCP_1}{\sum_{i \neq 0} RSCP_i} > \tau_2; \qquad (4)$$

$$\frac{RSCP_1}{\sum_{i \neq 0,1} RSCP_i} > \tau_1; \qquad (5)$$

$$\frac{RSCP_1}{\left(\frac{E_{c,CPICH}}{I_{or}}\right) RSSI - RSCP_1} > \tau_1; \qquad (6)$$

$$\frac{RSCP_1}{\left(\frac{E_{c,CPICH}}{I_{or}}\right) RSSI - RSCP_1 - RSCP_0} > \tau_1. \qquad (7)$$

Advantageous IC Features in the RE Region, and Related Support Info

As previously outlined, at least two IC feature types are particularly advantageous for a UE in the RE region. These will be outlined below, using the High-Speed Downlink Packet Access (HSDPA) setup as an example.

First, post-decoding IC of traffic data channel is particularly advantageous for a UE in the RE region. To perform post-decoding IC, however, the UE needs to obtain full modulation format and transport format resource combination (TFRC) information for the interfering signal. Several approaches are possible for obtaining this information. First, the UE may be configured to eavesdrop on the macro cell's legacy HS-SCCH transmissions, blindly detect the control message UE ID, and use that UE ID to decode the interfering HS-SCCH message. Alternatively, the UE may be configured to eavesdrop on the macro cell's legacy HS-SCCH transmissions, receive assistance information that identifies the interfering signal's UE ID from the network, and use that UE ID to decode the interfering HS-SCCH message. As another alternative, all of the interfering signal configuration information could be read from an assistance broadcast channel transmitted by the macro cell. As still another alternative, the interfering signal configuration information could be read from an assistance signaling channel transmitted by the macro cell and beam-formed and/or power controlled to one or more LPN-served UEs.

Once the interfering signal configuration info is available, the UE may perform post-decoding IC on the traffic data signal. Additionally, the UE may determine whether post-decoding IC provides performance gains over pre-decoding IC for the current realization and select the instantaneous pre- or post-decoding IC mode accordingly.

Second, if a large fraction of High-Speed Physical Downlink Shared Channel (HS-PDSCH) traffic data power may be removed by IC, cancelling additional non-high-speed-data power provides increasingly large returns in terms of own-cell SINR improvement. Some non-data channels, e.g., pilot/reference channels with known contents, may be cancelled without additional support information. For other channels, additional support information is required to perform IC. This additional support information may be obtained using one or several of the techniques discussed above, including via the reception of network-provided assistance information.

For example, some data and control channels require resource allocation info for reception. For instance, decoding the downlink dedicated physical channel (DPCH) requires instantaneous code allocation information, including the spreading factor (SF). The High-Speed Shared Control Channel (HS-SCCH), the Secondary Common Control Physical Channel (S-CCPCH), and other control channels require static code allocation information.

Some control channels require UE-specific signature information for decoding. For instance, decoding the HS-SCCH requires UE ID information, while decoding the E-DCH Hybrid Indicator Channel (E-HICH) and the E-DCH Relative Grant Channel (E-RGCH) requires signature hopping pattern sequence index information.

Some low-rate broadcast, control, and data channels may be regenerated and removed if assistance information carrying the message contents of those channels is made available to the UE. It is generally not possible to receive and decode these channels on the fly in the UE, since their transmission-time intervals (TTIs) are often are much longer than the HSDPA TTI. Examples include the DPCH, the Primary Common Control Physical Channel (P-CCPCH) carrying the Broadcast Channel (BCH), etc. Note that large parts of the BCH contents are repetitive and may be obtained from past messages. In some embodiments, then, only the changed parts are signaled as assistance information.

Network Assistance Signaling Channels

The network may provide the additional assistance information via one or more of the following mechanisms:
- a separate control channel transmitted from the macro—broadcast;
- a separate control channel transmitted from the macro—non-broadcast, power-controlled to the set of one or more UEs served by one or more LPNs;
- a separate control channel transmitted from the LPN—non-broadcast, power-controlled to the UE; and
- in-band signaling in the LPN traffic data, separately packaged so as to be readable prior to IC.

In some embodiments, to receive non-broadcast information from the macro or LPN nodes, the UE sends a higher-layer message to the network requesting assistance information to be transmitted. This message may be triggered by the UE's detecting that it is in the RE region, in some embodiments. Optionally, the request may indicate the information subset of interest, or the subset may be implied from the initial UE capability signaling. The network then receives the message and configures its network assistance functionality to transmit requested information to the UE on a per-TTI basis, for example. Note that the LPN-based signaling of information originating from the macro cell is possible in the combined cell deployment since the macro and LPN nodes are controlled from the same physical base station unit, e.g., with the LPNs acting as remote radio units (RRUs).

Example Implementation

The inventive techniques disclosed herein may be demonstrated using the example of an IC-capable HSDPA UE that needs to receive its serving cell downlink signal in the presence of a dominant interfering macro cell downlink signal. While the channel structure details may differ, the concepts and techniques illustrated in this example are equally applicable in other radio access technologies (RATs), such as in LTE systems.

Figure 4:
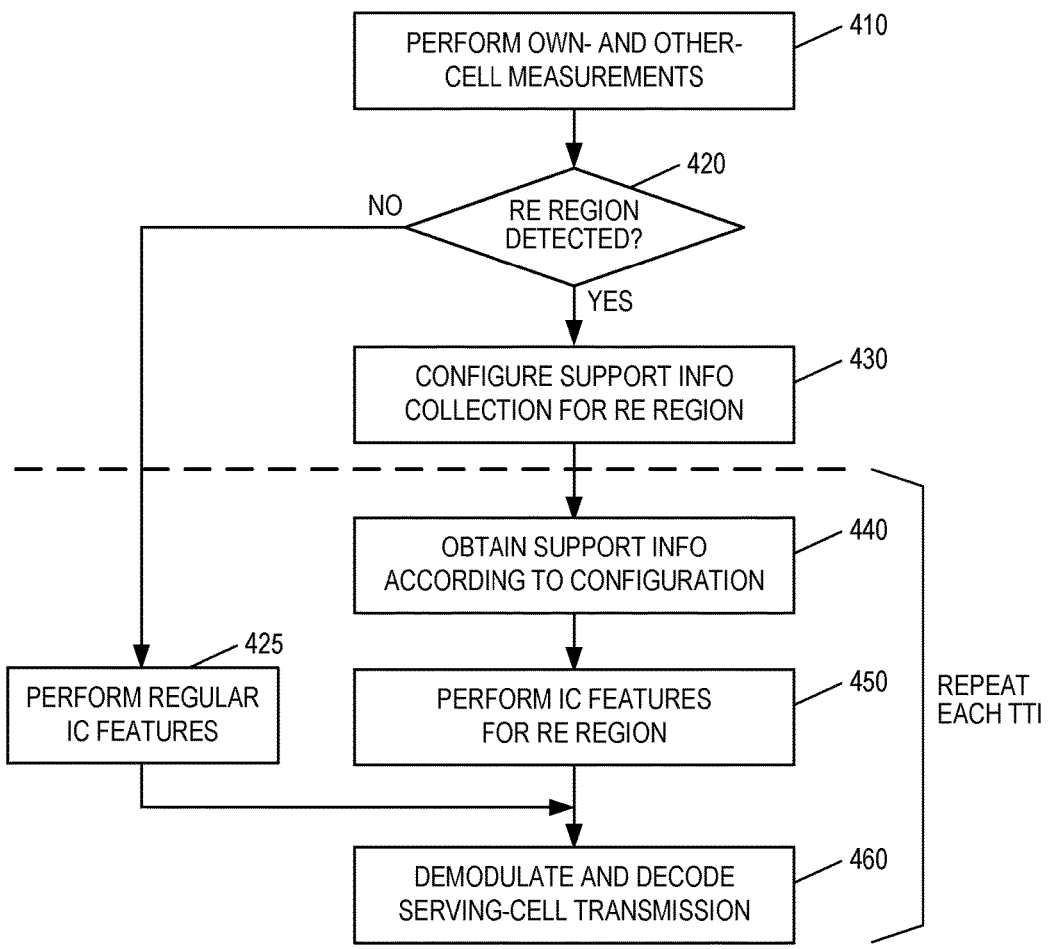
FIG. 4 is a flow chart illustrating operations of receivers according to some embodiments.

An example method, implemented in a wireless mobile terminal, is shown in FIG. 4. A UE that is newly allocated a serving cell does not initially know whether its serving cell is a macro or a LPN. By performing own-cell and neighbor-cell measurements over a certain time period, e.g., over a few 100 milliseconds, as shown at block 410, it can determine whether it is currently served by a LPN and located in the RE region, as shown at block 420. This can be done by using one or more of the tests outlined above, including, in some embodiments, an evaluation of the serving-cell geometry and a test to indicate whether there is a dominant interferer with a signal power that far exceeds that of all other received signals. If a RE region is detected, the UE proceeds by selectively applying IC procedures based on said detection. If not, the UE applies standard IC procedures, as shown at block 425, or does not perform IC at all, in various embodiments.

Once a RE region has been detected, the UE configures its IC receiver to obtain support information, as shown at block 430, to carry out one or more IC features that are beneficial in the RE regime, e.g., post-decoding IC and non-data channel IC. This configuring step may include one or more of the following, for example:
- Configure blind detection of UE signature and resource allocation parameters from macro cell data and/or control channels;
- Configure eavesdropping of macro cell data and/or control channels;
- Request network assistance information from the network and configure receiving network assistance information via macro cell non-broadcast channels; and
- Configure receiving network assistance info via macro cell broadcast channels.

At each TTI, the UE then receives and processes macro cell legacy channels and/or network assistance channels according to the above configuration, as shown at block 440, and performs data channel post-decoding IC and/or non-data channel IC on the macro cell signal, as shown at block 450. Finally, the UE uses the interference-cancelled received signal to demodulate and decode the LPN data and control signals intended for the UE, as shown at block 460.

Figure 5:
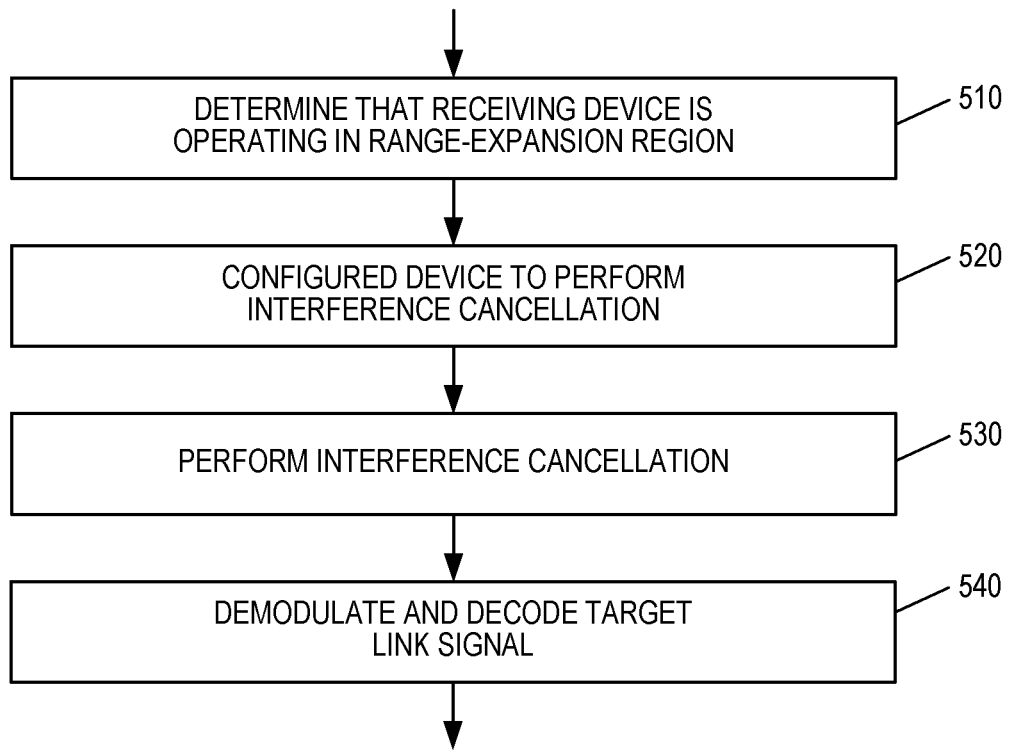
FIG. 5 is another flow chart illustrating an example method of receiving a target link signal at a receiving device, wherein the target link signal is received in a received signal that also includes an interfering link signal.

FIG. 5 is a process flow diagram that illustrates a method of receiving a target link signal at a receiving device, wherein the target link signal is received in a received signal that also includes an interfering link signal. As shown at block 510, the illustrated method includes determining that the receiving device is operating in a range-expansion region of a low-power node in a heterogeneous network deployment, based on a serving-cell geometry metric or a dominant-interferer ratio metric or both. As shown at block 520, the method further includes configuring the receiving device to perform interference cancellation, responsive to determining that the receiving device is operating in a range-expansion region. The example method continues with performing the configured interference cancellation on the interfering link signal, as shown at block 530, and then, as shown at block 540, demodulating and decoding the target link signal to provide a target link bit stream.

As described in detail above, the particulars of the configuring the receiving device to perform interference cancellation are based on the determination that the receiving device is in a range-expansion region. Thus, for example, this configuring may include selecting one or more of a plurality of interference-cancellation techniques, where the selection is based on determining that the receiving device is operating in the range-expansion region. In some embodiments, for example, a post-decoding data-channel interference-cancellation technique is selected in response to determining that the receiving device is operating in the range-expansion region, while a pre-decoding technique might otherwise be used for decoding data-channel interference. In some embodiments, a non-data-channel interference-cancellation technique may also be selected in response to determining that the receiving device is operating in the range-expansion region, such that performing said interference cancellation on the interfering link signal comprises performing both the post-decoding data-channel interference-cancellation technique and the non-data-channel interference-cancellation technique on the interfering link signal.

In some embodiments, performing interference cancellation on the interfering link signal comprises generating an interference-cancellation signal according to an interference-cancellation technique and incorporating information of the interference-cancellation signal in the received signal. The subsequent demodulating and decoding of the target link signal is responsive to said incorporating information of the interference-cancellation signal in the received signal.

In some embodiments, configuring the receiving device to perform interference cancellation includes configuring the receiver to receive relevant signals from the network, the relevant signals comprising one or more of signal format information for the interfering link signal, mobile terminal identifier information for the interfering link signal, and control signal contents for the interfering link signal. Performing the interference cancellation then includes obtaining the relevant signals and using the relevant signals to perform interference cancellation, on a per-transmit-time-interval basis. In some embodiments, at least a portion of the relevant signals are obtained via assistance information transmitted from an interfering cell. In addition or alternatively, at least a portion of the relevant signals may be obtained via assistance information transmitted from a serving cell. Likewise, at least a portion of the relevant signals may be obtained via blind decoding performed on an interfering channel signal.

As was discussed in detail above, in some embodiments, determining that the receiving device is operating in the range-expansion region is based at least in part on evaluating a signal geometry for the target link signal and determining that the signal geometry for the target link signal is less than about −2 dB. In some of these and in some other embodiments, determining that the receiving device is operating in the range-expansion region is based at least in part on determining that the proportion of received interference power generated by a single interfering source exceeds a first predetermined threshold. For instance, determining that the proportion of received interference power generated by a single interfering source exceeds a predetermined threshold may comprise determining that $$\frac{RSCP_1}{\sum_{i\neq 1} RSCP_i} > \tau_1,$$

where $RSCP_i$ is the received signal code power for cell i, i=1 for the single interfering source, i=0 for the target link signal, and $\tau_1$ is the first predetermined threshold.

In some embodiments, determining that the receiving device is operating in the range-expansion region is based at least in part on computing a ratio of the received signal code power (RSCP) for the interfering link signal to a scaled measure of the total received signal power and comparing the ratio to a second predetermined threshold. For example, determining that the receiving device is operating in the range-expansion region may include determining that $$\frac{RSCP_1}{\left(\frac{E_{c,CPICH}}{I_{or}}\right)RSSI} > \tau_2,$$

where $RSCP_1$ is the received signal code power for the interfering link signal, RSSI is the total received power, $$\left(\frac{E_{c,CPICH}}{I_{or}}\right)$$

is the fraction of transmitted base station power allocated to the common pilot channel, and $\tau_2$ is the predetermined threshold.

Figure 2:
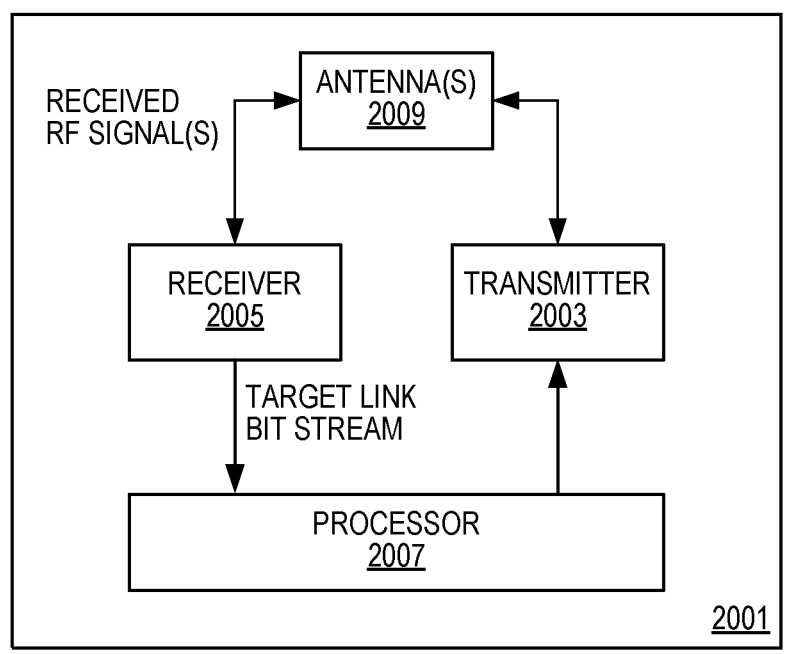
FIG. 2 is a block diagram of a communications device according to some embodiments.

FIG. 2 illustrates a radio communications device 2001 that may be configured to carry out the technique illustrated in FIG. 4 and/or any of the variants described above. Radio communications device 2001 includes transmitter 2003, receiver 2005, processor 2007, and antenna(s) 2009. For received communications, receiver 2005 is configured to generate a received bit stream responsive to received RF (radio frequency) signals from antenna(s) 2009, and processor 2007 (also referred to as a processing circuit) is configured to process this TL bit stream to reconstruct communications (e.g., voice and/or data communications) from a remote party. For transmitted communications, processor 2007 is configured to generate a transmitted bit stream (representing voice and/or data communications), and transmitter 2003 is configured to modulate and transmit this bit stream through antenna(s) 2009 over a radio frequency channel.

Radio communications device 2001, for example, may be implemented as a mobile terminal and/or as a base station. With radio communications device 2001 provided as a mobile wireless terminal, such as a UE configured for operation in a 3GPP wireless communications network, radio communications device 2001 may include a user interface (allowing tactile/audio/video user input and/or providing visual/audio output) coupled to processor 2007, and the user interface may include a keypad, a display, a touch sensitive display, a touch pad, a track ball, a joy stick, a speaker, a microphone, a photo/video camera, etc. With radio communications device 2001 provided as a base station, processor 2007 may be coupled to a base station controller and/or a mobile switching center, and processor 2007 may thus support a communications link (through antenna 2009, transmitter 2003, and/or receiver 2005) between one or more mobile wireless terminals in a coverage area (or cell) of communications device 2001 and remote communications devices (e.g., servers, conventional telephones, other wireless terminals in the same or other coverage areas, etc.). Note that processor 2007 may include one or more microprocessors, digital signal processors, and/or special purpose digital logic, and may further include memory circuits storing program code for execution by the one or more microprocessors, digital signal processors, etc. This program code, in addition to including program instructions for operating in a wireless communications network according to, for example, the 3GPP standards for UTRAN and/or E-UTRAN, may also comprise program instructions for controlling one or more interference cancellation techniques in receiver 2005, as described herein, as well as for carrying out one or more of the techniques described above for selectively performing interference cancellation in response to detecting operation in a range-expansion region of a heterogeneous network.

Whether radio communications device 2001 is implemented as a mobile wireless terminal or as a base station, receiver 2005 may be configured to generate a TL bit stream corresponding to signals received over an RF TL from a remote communications device. If radio communications device 2001 is a mobile wireless terminal, receiver 2005 may be configured to generate the TL bit stream responsive to downlink signals received over a TL transmitted from a TL base station at communications device 2001, and an IL(s) may be transmitted by a different IL base station(s) of the same system to another wireless terminal as shown in FIG. 1B, by the same base station to a different wireless terminal as shown in FIG. 1C, and/or by other wireless terminals.

As discussed in greater detail below, receiver 2005 (also referred to as target receiver 2005) may be configured to reduce an effective power of an IL signal or signals, as perceived/received at target receiver 2005, to improve reception of a TL signal, thereby improving a quality and/or data rate of a TL bit stream. By reducing an effective power of an IL signal, as perceived/received at target receiver 2005, for example, receiver 2005 may support an increased data rate for a TL signal received from a remote communications device.

Figure 3:
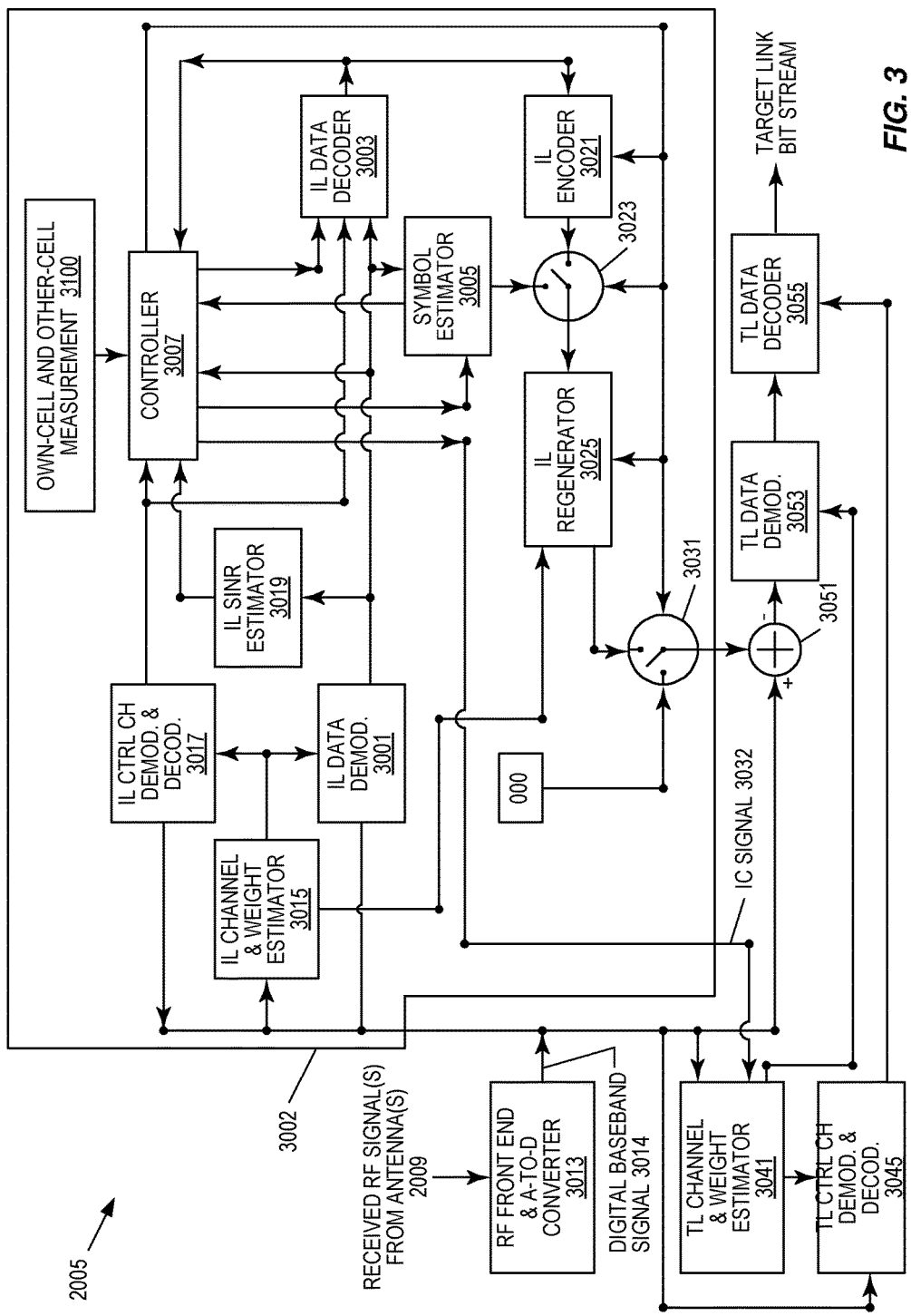
FIG. 3 is a block diagram illustrating a receiver of the communications device of FIG. 2 according to some embodiments.

As noted above, a UE configured to carry out the above-summarized techniques may be configured as shown in FIG. 2. FIG. 3 provides additional details of an example receiver 2005, which is configured to carry out interference cancellation according to one or several techniques. Thus, in some embodiments the receiver illustrated in FIG. 3 is part of a UE.

As shown in FIG. 3, receiver 2005 includes a radio-frequency front-end and Analog-to-Digital (A-to-D) converter 3013, IL estimator 3002, TL channel and weight estimator 3041, TL control channel demodulator and decoder 3045, combiner 3051, TL data demodulator 3053, TL decoder 3055, and own-cell and other-cell measurement circuit 3100. Own-cell and other-cell measurement circuit 3100 is configured to perform one or more measurements for the TL signal, the IL signal, and for any other known interfering signals. These measurements may comprise, for example, RSSI measurements and RSCP measurements.

RF front-end and A-to-D converter 3013 is configured to generate digital baseband signal 3014 responsive to RF signals received through antenna(s) 2009 of FIG. 2, and IL estimator 3002 may be configured to generate an interference cancellation IC signal 3032 representing an IL signal (as perceived/received at target receiver 2005) responsive to the digital baseband signal 3014. More particularly, IL estimator 3002 is configured to estimate a quality of the IL signal (as perceived/received at target receiver 2005).

TL data demodulator 3053 may be configured to incorporate information of the interference cancellation signal 3032 with the digital baseband signal 3014 when demodulating the digital baseband signal to generate a demodulated TL signal. According to some embodiments, combiner 3031 may be configured to incorporate information of the interference cancellation IC signal 3032 in the received digital baseband signal 3014 by combining the interference cancellation signal 3032 and the received digital baseband signal 3014 to provide an interference reduced TL digital base band signal, and TL data demodulator 3053 may be configured to demodulate the interference reduced TL digital baseband signal to provide the demodulated TL signal. Accordingly, the interference cancellation signal 3032 may be combined with (e.g., subtracted from) the received digital baseband signal 3014 using combiner 3051 to reduce a strength of the IL signal (as perceived/received at target receiver 2005) in the received digital base band signal 3014. While combiner 3051 and TL data demodulator 3053 are shown as separate elements, combiner 3051 and TL data demodulator 3053 and/or elements thereof may be combined. According to other embodiments, information of the interference cancellation signal 3032 may be incorporated in the digital baseband signal 3014 by modifying demodulator metrics (for target link data demodulator 3053) responsive to the interference cancellation signal 3032, and TL data demodulator 3053 may be configured to demodulate the received digital baseband signal using the modified demodulator metrics. The interference cancellation signal 3032, for example, may be used by TL channel and weight estimator 3041 to provide an improved estimate(s) of the TL channel and/or weights used by TL data demodulator 3053.

The resulting demodulated TL signal may then be decoded using TL decoder 3055 to generate the TL bit stream that is provided to processor 2007 (see FIG. 2). In addition, TL channel and weight estimator 3041 may be configured to provide estimates of the TL channel and/or weights, and these estimates may be provided to TL data demodulator 3053 and/or to TL control channel demodulator and decoder 3045 to facilitate more accurate demodulation. TL control channel demodulator and decoder 3045 may be configured to demodulate and decode a TL control channel (transmitted from the TL transmitter) to determine a modulation and coding scheme MCS for the TL that may be used by decoder 3055 to decode the TL bit stream. If communication device 2001 is a wireless terminal and the target and interfering link signals are High Speed Downlink Data Channel (HS-PDSCH) signals according to the High-Speed Downlink Packet Access (HSDPA) standard, for example, the TL control channel may be a High Speed Shared Control Channel HS-SCCH transmitted by the same base station that transmits the TL signal.

As shown in FIG. 3, IL estimator 3002 may include IL channel and weight estimator 3015 that is configured to estimate the channel and weights for the IL signal as received/perceived at receiver 2005 responsive to received digital baseband signal 3014. The estimated channel and/or weights may be provided to IL data demodulator 3001 and to IL control channel demodulator and decoder 3017. IL control channel demodulator and decoder 3017 may thus demodulate and decode a control channel from the IL transmitter (responsive to digital baseband signal 3014 and using the estimated channel and weights from IL channel and weight estimator 3015) to provide a modulation and coding scheme (MCS), e.g., including modulation and transport block size information, for the IL signal to controller 3007 and to IL data decoder 3003. If communication device 2001 is a wireless terminal and the target and interfering link signals are downlink signals according to the HSDPA standard, for example, the IL control channel may be a High Speed Shared Control Channel (HS-SCCH) transmitted by the same base station that transmits the IL signal.

Similarly, IL data demodulator 3001 may be configured to demodulate the IL signal (using the estimated channel and weights from IL channel and weight estimator 3015) to provide a demodulated IL signal. IL data demodulator 3001 and/or IL channel and weight estimator 3015 may thus demodulate the received digital base band signal 3014 (using estimates of the IL channel and/or weights as perceived/received at target receiver 2005) to provide data symbols for the interfering link signal, for example, using linear receiver techniques (e.g., using Generalized RAKE receiver techniques, Linear Minimum Mean Squared Error or LMMSE receiver techniques, chip equalizer receiver techniques, Frequency-Domain Equalization or FDE receiver techniques, etc.). Using linear receiver techniques, for example, delay and channel estimation may be performed on the interfering link signal (as perceived/received at target receiver 2005), followed by conventional weight computation, weight application, and/or dispreading (where the order of weight application and dispreading may be reversed).

In addition, IL SINR (signal-to-interference-and-noise ratio) estimator 3019 may be configured to estimate a quality (e.g., SINR_I) of the IL signal, as perceived/received at target receiver 2005, responsive to the demodulated IL signal generated by IL data demodulator 3001. IL SINR estimator 3019 and/or controller 3007, for example, may estimate the quality of the IL signal as perceived/received at target receiver 2005, using a pilot component of the IL signal and/or using data symbols provided by interfering link data demodulator 3001.

A relatively high SINR for the IL signal, as perceived/received at target receiver 2005, may indicate that the IL signal may be received at target receiver 2005 at a relatively high quality, while a relatively low SINR for the IL signal may indicate that the IL signal may be received at target receiver 2005 at relatively low quality. With a relatively high SINR for the IL signal, the IL signal may be a relatively strong interferer with respect to the TL signal, but IL estimator 3002 may be able to more accurately reproduce the IL signal to provide improved cancellation thereof. This is generally the case for the range-expansion region of a LPN in a heterogeneous network. With a relatively low SINR for the IL signal, IL estimator 3002 may be less accurate in reproducing the IL signal so that less accurate interference cancellation is provided.

Controller 3007, for example, may be configured to select a technique for interference cancellation responsive, at least in part, to detecting that the receiver is operating in the range-expansion region of a heterogeneous network. Controller 3007, which may comprise one or more microprocessors, microcontrollers, digital signal processors, or the like, coupled to a memory circuit configured with appropriate firmware and/or software, may be configured to carry out the method illustrated in FIG. 4, for example, or any of the variants described herein. It should be noted that controller 3007 may be a processing circuit that is dedicated to receiver and/or transmitter functions, in some embodiments, and thus separate from one or more other processors that control other functions of the a mobile terminal or other receiver device. In other embodiments, the functionality described above for controller 3007 may be part of the functionality performed by a processor that also controls other functionality in the mobile terminal or other receiver device. It will be appreciated that the functionality described above for controller 3007 may be split among two or more processing circuits, in some embodiments.

Elements/blocks of FIG. 3 are shown by way of illustration without limiting implementation of functionalities thereof. For example, switches 3023 and 3031 are shown separately, but functionalities thereof may be implemented in a single switch. Switch 3023, for example, may select between symbol estimator 3005 and IL encoder 3021, and a zero magnitude (000) output of IL regenerator 3025 may be effectively provided by controller 3007 turning IL regenerator 3025 off. Moreover, switch 3023 may be integrated with IL regenerator 3025, and/or elements/functionalities of IL regenerator may be provided on opposite sides of switch 3023. For example, a modulator element/functionality of IL regenerator 3025 may be provided between IL encoder 3021 and switch 3023, with spreading and filtering elements/functionalities of IL regenerator 3025 remaining between switches 3023 and 3031.

While symbol estimator 3005 is shown by way of example, symbol estimation may not be required so that an output of IL data demodulator 3001 may be provided directly to IL regenerator 3025 without hard/soft symbol estimation. According to still other embodiments, controller 3007 may control symbol estimator 3005 during pre-decoder interference cancellation to provide hard symbol decision estimates, soft symbol decision estimates, or no estimates (e.g., providing an output of IL data demodulator 3001 directly to IL regenerator 3025) responsive to the quality of the IL signal as perceived/received at target receiver 2005. For example, symbol estimator 3005 may generate hard symbol estimates responsive to a relatively high quality of the IL signal (less than the threshold for post-decoder IC) as perceived/received at target receiver 2005, symbol estimator 3005 may generate soft symbol estimates responsive to a medium quality of the IL signal (less than the threshold for post-decoder IC) as perceived/received at target receiver 2005, and symbol estimator 3005 may be bypassed responsive to a relatively low quality of the IL signal (less than the threshold for post-decoder IC) as perceived/received at target receiver 2005. According to some embodiments, symbol estimator 3005 may generate hard decision symbol estimates without an explicit symbol manipulation stage by using signs of extracted soft bit values to generate corresponding constellation point labels that may be processed through IL regenerator 3025 to regenerate the digital baseband estimate of the interfering link signal as perceived/received at target receiver 2005.

IL regenerator 3025 may be configured to spread and filter (with estimates of the IL channel) the demodulated IL signal generated by IL data demodulator 3001 and/or symbol estimator 3005 to provide the interference cancellation signal 3032 as a digital baseband estimate of the IL signal as perceived/received at target receiver 2005, without decoding the demodulated IL signal, responsive to selecting pre-decoder interference cancellation, and to provide an interference cancellation signal having zero magnitude responsive to selecting TL data demodulation without pre-decoder interference cancellation. Switch 3031, for example, may be configured to select an output of IL regenerator 3025 as interference cancellation signal 3032 responsive to selecting pre-decoder interference cancellation, or to select zero magnitude as interference cancellation signal 3032 responsive to selecting TL data demodulation without pre-decoder interference cancellation.

According to still further embodiments, IL demodulator 3001 may be configured to demodulate the IL signal to provide a demodulated IL signal, and IL decoder 3003 may be configured to decode the demodulated IL signal to provide a decoded IL signal. Moreover, controller 3007 may be configured to perform error detection/correction on the decoded IL signal, e.g., using a cyclic redundancy code (CRC), and to determine success/failure of the error detection/correction on the decoded IL signal. Responsive to selecting post-decoder interference cancellation, e.g., in response to a determination that the receiver is operating in the RE region of a LPN node, IL encoder 3021 may be configured to encode the decoded IL signal to provide an encoded IL signal. IL regenerator 3025 may be configured to modulate, spread and filter (with an estimate of the interfering link channel) the encoded IL signal to provide the interference cancellation signal 3032 responsive to selecting post-decoder interference cancellation, and to spread and filter the demodulated IL signal to provide the interference cancellation signal 3032 responsive to selecting pre-decoder interference cancellation.

According to yet further embodiments, controller 3007 may be configured to select post-decoder interference cancellation responsive to determining that the receiver is operating in the RE region, and to select TL demodulation without interference cancellation responsive to determining that the receiver is not. IL encoder 3021 may be configured to encode the decoded IL signal to provide an encoded IL signal responsive to selecting post-decoder interference cancellation. IL regenerator 3025 may be configured to modulate, spread, filter (with an estimate of the interfering link channel), etc., the encoded IL signal to provide the interference cancellation signal responsive to selecting post-decoder interference cancellation, and to provide an interference cancellation signal having zero magnitude responsive to selecting demodulation without post-decoder interference cancellation. Switch 3031 and/or elements/functionality thereof may be included in IL regenerator 3025 so that regenerator 3025 may be considered as selecting between an interference cancellation signal as an estimate of the IL signals (as perceived/received at target receiver 2005) and a zero magnitude interference cancellation signal. As used herein, selection of a zero magnitude interference cancellation signal may be equivalent to omitting interference cancellation.

In various embodiments of the apparatus disclosed herein, a processor circuit, such as a CPU and associated memory circuits, are configured to carry out one or more of the techniques described in detail above. Other embodiments may include mobile terminals or other receiver devices that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 6:
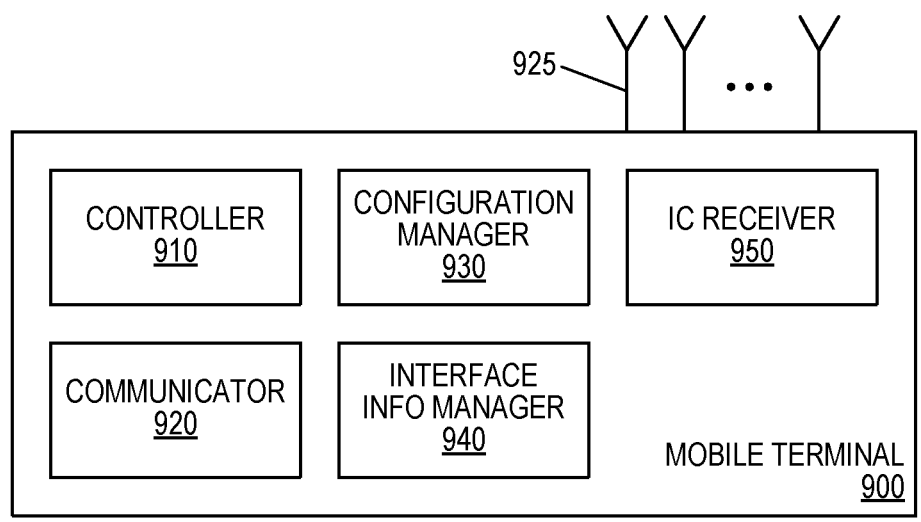
FIG. 6 is a block diagram illustrating functional elements of an example mobile terminal, according to some embodiments of the presently disclosed techniques and apparatus.

It will be appreciated that the functionality provided by the one or more processor circuits and/or receiver circuits in a receiver device can be represented in terms of functional modules, which may correspond, in some cases, to corresponding modules of program code for execution by a processor circuit. FIG. 6 thus provides a different view of an example mobile terminal 900, which in this case is represented with functional modules.

As seen in the figure, mobile terminal 900 may comprise several functional modules including a controller module 910, a communicator module 920, a configuration manager 930, an interference information manager 940, and an IC receiver 950. The communicator module 920 is adapted to communicate with other network nodes, such as a base station and a Radio Network Controller (RNC) (through higher layer signaling), via radio transmitter circuitry. The configuration manager 930 is adapted to manage configuration information and to configure IC receiver 950 to perform IC that is most appropriate for the current conditions. The interference information manager 940 is adapted to manage the interference information received from the network node. The IC receiver 950 is adapted to cancel interferences based on the configuration information and interference information. The controller 910 is adapted to control an overall operation of the mobile terminal 900 and to carry out one or more of the techniques detailed herein.

It will be appreciated, then, that mobile terminal 900 includes a receiver 950 configured to receive a target link signal, where the target link signal is received in a received signal that also includes an interfering link signal, and further includes a controller 910 that is configured to determine that the mobile terminal is operating in a range-expansion region of a low-power node in a heterogeneous network deployment, based on a serving-cell geometry metric or a dominant-interferer ratio metric or both. Mobile terminal 900 further comprises a configuration module 930 that is adapted to configure the receiver 950 to perform interference cancellation, responsive to the controller's determining that the mobile terminal is operating in a range-expansion region. The receiver 950, in turn, is arranged to perform said interference cancellation on the interfering link signal and to demodulate and decode the target link signal to provide a target link bit stream. All of the variants of the techniques described above are, of course, equally applicable to the mobile terminal apparatus shown in FIG. 6.

Embodiments of interference cancellation receivers and/or methods discussed above may be implemented for uplink and/or downlink communications according to different communications standards. According to some embodiments, interference cancellation may be implemented for uplink and/or downlink data communications according to standards such as the High Speed Packet Access (HSPA) standard. For example, interference cancellation disclosed herein may be implemented in wireless terminal receivers for downlink data communications according to the High-Speed Downlink Packet Access (HSDPA) standard. In these embodiments, target and interfering link signals may be provided as High Speed Downlink Data Channels (HS-PDSCH), and MCS information for IL signals may be received over a High Speed Shared Control Channel (HS-SCCH) associated with the IL signal.

Hybrid receiver structures and methods according to some embodiments discussed herein may thus provide improved interference mitigation (and thus improved geometry factors) using available resources over different/changing channel and/or interference conditions. By selecting an appropriate interference cancellation technique responsive to determining whether or not the receiver is operating in the range-expansion region of an LPN in a heterogeneous network, inter-symbol interference (ISI) suppression may be improved for any ISI on the target link signal because interference due to the interfering link signal may be significantly suppressed without using a spatial degree of freedom of the underlying linear receiver. Accordingly, all spatial degrees of freedom may remain available for ISI suppression.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray™).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added and/or inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of various example combinations and sub-combinations of embodiments and of the manner and process of making and using them, and shall support claims to any such combination or sub-combination.

Many variations and modifications can be made to the embodiments without substantially departing from the principles of the present invention. Several specific examples of embodiments are provided below. It should be appreciated, however, that other embodiments of the techniques, apparatus, and systems as described herein are possible.

What is claimed is:

1. A method of receiving a target link signal at a receiving device, wherein the target link signal is received in a received signal that also includes an interfering link signal, the method comprising:
   determining that the receiving device is operating in a range-expansion region of a low-power node in a heterogeneous network deployment, based on a serving-cell geometry metric or a dominant-interferer ratio metric or both;
   responsive to determining that the receiving device is operating in a range-expansion region, configuring the receiving device to perform interference cancellation, wherein said configuring is based on said determining;
   performing said interference cancellation on the interfering link signal; and
   demodulating and decoding the target link signal to provide a target link bit stream.

2. The method of claim 1, wherein configuring the receiving device to perform interference cancellation comprises selecting one or more of a plurality of interference-cancellation techniques, wherein said selecting is based on determining that the receiving device is operating in the range-expansion region.

3. The method of claim 2, wherein said selecting comprises selecting a post-decoding data-channel interference-cancellation technique in response to determining that the receiving device is operating in the range-expansion region.

4. The method of claim 3, wherein said selecting further comprises selecting a non-data-channel interference-cancellation technique in response to determining that the receiving device is operating in the range-expansion region, and wherein performing said interference cancellation on the interfering link signal comprises performing both the post-decoding data-channel interference-cancellation technique and the non-data-channel interference-cancellation technique on the interfering link signal.

5. The method of claim 1, wherein performing said interference cancellation on the interfering link signal comprises generating an interference-cancellation signal according to an interference-cancellation technique and incorporating information of the interference-cancellation signal in the received signal, and wherein demodulating and decoding the target link signal is responsive to said incorporating information of the interference-cancellation signal in the received signal.

6. The method of claim 1, wherein configuring the receiving device to perform interference cancellation comprises configuring the receiver to receive relevant signals from the network, the relevant signals comprising one or more of signal format information for the interfering link signal, mobile terminal identifier information for the interfering link signal, and control signal contents for the interfering link signal; and wherein performing the interference cancellation comprises obtaining the relevant signals and using the relevant signals to perform interference cancellation on a per-transmit-time-interval basis.

7. The method of claim 6, wherein at least a portion of the relevant signals are obtained via assistance information transmitted from an interfering cell.

8. The method of claim 6, wherein at least a portion of the relevant signals are obtained via assistance information transmitted from a serving cell.

9. The method of claim 6, wherein at least a portion of the relevant signals are obtained via blind decoding performed on an interfering channel signal.

10. The method of claim 1, wherein determining that the receiving device is operating in the range-expansion region is based at least in part on evaluating a signal geometry for the target link signal and determining that the signal geometry for the target link signal is less than about −2 dB.

11. The method of claim 1, wherein determining that the receiving device is operating in the range-expansion region is based at least in part on determining that the proportion of received interference power generated by a single interfering source exceeds a first predetermined threshold.

12. The method of claim 11, wherein determining that the proportion of received interference power generated by a single interfering source exceeds a predetermined threshold comprises determining that $$\frac{RSCP_1}{\sum_{i \neq 1} RSCP_i} > \tau_1,$$

where $RSCP_i$ is the received signal code power for cell i, i=1 for the single interfering source, i=0 for the target link signal, and $\tau_1$ is the first predetermined threshold.

13. The method of claim 1, wherein determining that the receiving device is operating in the range-expansion region is based at least in part on computing a ratio of the received signal code power (RSCP) for the interfering link signal to a scaled measure of the total received signal power and comparing the ratio to a second predetermined threshold.

14. The method of claim 13, wherein determining that the receiving device is operating in the range-expansion region comprises determining that $$\frac{RSCP_1}{\left(\frac{E_{c,CPICH}}{I_{or}}\right)RSSI} > \tau_2,$$

where $RSCP_1$ is the received signal code power for the interfering link signal, RSSI is the total received power, $$\left(\frac{E_{c,CPICH}}{I_{or}}\right)$$

is the fraction of transmitted base station power allocated to the common pilot channel, and $\tau_2$ is the predetermined threshold.

15. A receiver device comprising a receiver circuit configured to receive a target link signal wherein the target link signal is received in a received signal also including an interfering link signal, and further comprising a controller circuit configured to:
control the receiver circuit to perform own-cell and other-cell measurements;
determine that the receiver device is operating in a range-expansion region of a low-power node in a heterogeneous network deployment, based on a serving-cell geometry metric or a dominant-interferer ratio metric or both;
responsive to determining that the receiver device is operating in a range-expansion region, configure the receiver circuit to perform interference cancellation, wherein said configuring is based on said determining; and
control the receiver circuit to perform said interference cancellation on the interfering link signal and to demodulate and decode the target link signal to provide a target link bit stream.

16. The receiver device of claim 15, wherein the controller circuit is configured to configure the receiving circuit to perform interference cancellation by selecting one or more of a plurality of interference-cancellation techniques, wherein said selecting is based on determining that the receiver device is operating in the range-expansion region.

17. The receiver device of claim 16, wherein said selecting comprises selecting a post-decoding data-channel interference-cancellation technique in response to determining that the receiver device is operating in the range-expansion region.

18. The receiver device of claim 17, wherein said selecting further comprises selecting a non-data-channel interference-cancellation technique in response to determining that the receiver device is operating in the range-expansion region, and wherein the controller circuit is configured to control the receiver circuit to perform both the post-decoding data-channel interference-cancellation technique and the non-data-channel interference-cancellation technique on the interfering link signal.

19. The receiver device of claim 15, wherein the receiver circuit is configured to perform said interference cancellation on the interfering link signal by generating an interference-cancellation signal according to an interference-cancellation technique and incorporating information of the interference-cancellation signal in the received signal, and to demodulate and decode the target link signal responsive to said incorporating information of the interference-cancellation signal in the received signal.

20. The receiver device of claim 15, wherein the controller circuit is configured to configure the receiver circuit to perform interference cancellation by configuring the receiver circuit to receive relevant signals from the network, the relevant signals comprising one or more of signal format information for the interfering link signal, mobile terminal identifier information for the interfering link signal, and control signal contents for the interfering link signal; whereby the receiver circuit is configured to perform the interference cancellation by obtaining the relevant signals and using the relevant signals to perform interference cancellation on a per-transmit-time-interval basis.

21. The receiver device of claim 20, wherein the controller circuit and receiver circuit are configured to obtain at least a portion of the relevant signals via assistance information transmitted from an interfering cell.

22. The receiver device of claim 20, wherein the controller circuit and receiver circuit are configured to obtain at least a portion of the relevant signals via assistance information transmitted from a serving cell.

23. The receiver device of claim 20, wherein the controller circuit and receiver circuit are configured to obtain at least a portion of the relevant signals via blind decoding performed on an interfering channel signal.

24. The receiver device of claim 15, wherein the controller circuit is configured to determine that the receiver device is operating in the range-expansion region based at least in part on evaluating a signal geometry for the target link signal and determining that the signal geometry for the target link signal is less than about −2 dB.

25. The receiver device of claim 15, wherein the controller circuit is configured to determine that the receiver device is operating in the range-expansion region based at least in part on determining that the proportion of received interference power generated by a single interfering source exceeds a first predetermined threshold.

26. The receiver device of claim 25, wherein the controller circuit is configured to determine that the proportion of received interference power generated by a single interfering source exceeds a predetermined threshold by determining that $$\frac{RSCP_1}{\sum_{i \neq 1} RSCP_i} > \tau_1,$$

where $RSCP_i$ is the received signal code power for cell i, i=1 for the single interfering source, i=0 for the target link signal, and $\tau_1$ is the first predetermined threshold.

27. The receiver device of claim 25, wherein the controller circuit is configured to determine that the receiver device is operating in the range-expansion region based at least in part on computing a ratio of the received signal code power (RSCP) for the interfering link signal to a scaled measure of the total received signal power and comparing the ratio to a second predetermined threshold.

28. The receiver device of claim 27, wherein the controller circuit is configured to determine that the receiver device is operating in the range-expansion region by determining that $$\frac{RSCP_1}{\left(\frac{E_{c,CPICH}}{I_{or}}\right) RSSI} > \tau_2,$$

where $RSCP_1$ is the received signal code power for the interfering link signal, RSSI is the total received power, $$\left(\frac{E_{c,CPICH}}{I_{or}}\right)$$

is the fraction of transmitted base station power allocated to the common pilot channel, and $\tau_2$ is the predetermined threshold.

29. A mobile terminal comprising a receiver configured to receive a target link signal wherein the target link signal is received in a received signal that also includes an interfering link signal, and further comprising:
  a controller configured to determine that the mobile terminal is operating in a range-expansion region of a low-power node in a heterogeneous network deployment, based on a serving-cell geometry metric or a dominant-interferer ratio metric or both;
  a configuration module for configuring the receiver to perform interference cancellation, responsive to the controller's determining that the mobile terminal is operating in a range-expansion region;
  wherein the receiver is arranged to perform said interference cancellation on the interfering link signal and to demodulate and decode the target link signal to provide a target link bit stream.

30. A non-transitory computer-readable medium comprising, stored thereupon, a computer program product for execution by a receiving device arranged to receive a target link signal, wherein the target link signal is received in a received signal that also includes an interfering link signal, the computer program product comprising program instructions for:
  determining that the receiving device is operating in a range-expansion region of a low-power node in a heterogeneous network deployment, based on a serving-cell geometry metric or a dominant-interferer ratio metric or both;
  responsive to determining that the receiving device is operating in a range-expansion region, configuring the receiving device to perform interference cancellation, wherein said configuring is based on said determining;
  performing said interference cancellation on the interfering link signal; and
  demodulating and decoding the target link signal to provide a target link bit stream.

* * * * *